US007835826B1

(12) United States Patent
Weigl et al.

(10) Patent No.: US 7,835,826 B1
(45) Date of Patent: Nov. 16, 2010

(54) ATTITUDE DETERMINATION SYSTEM FOR YAW-STEERING SPACECRAFT

(75) Inventors: Harald J. Weigl, Doylestown, PA (US); Neil E. Goodzeit, Princeton, NJ (US); Santosh Ratan, Highland Park, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 1116 days.

(21) Appl. No.: 11/485,974

(22) Filed: Jul. 14, 2006

Related U.S. Application Data

(60) Provisional application No. 60/749,637, filed on Dec. 13, 2005.

(51) Int. Cl.
*B64G 1/24* (2006.01)
(52) U.S. Cl. .......................................... 701/4; 244/164
(58) Field of Classification Search ................. 701/3–4, 701/13, 220–223, 226; 244/164–165, 171, 244/3.21, 3.22, 3.16; 342/355, 62, 76, 81, 342/95–97, 352, 354
See application file for complete search history.

(56) References Cited

U.S. PATENT DOCUMENTS

| 3,813,067 | A | 5/1974 | Mork |
| 4,062,509 | A | 12/1977 | Muhlfelder et al. |
| 4,071,211 | A | 1/1978 | Muhlfelder et al. |
| 4,219,940 | A | 9/1980 | Okubo |
| 4,537,375 | A | 8/1985 | Chan |
| 4,654,846 | A | 3/1987 | Goodwin et al. |
| 4,754,280 | A | 6/1988 | Brown et al. |
| 4,767,084 | A | 8/1988 | Chan et al. |
| 4,890,284 | A | 12/1989 | Murphy et al. |
| 5,025,381 | A | 6/1991 | Goodzeit et al. |
| 5,058,835 | A | 10/1991 | Goodzeit et al. |
| 5,062,051 | A | 10/1991 | Sainct et al. |
| 5,080,307 | A | 1/1992 | Smay et al. |
| 5,092,543 | A | 3/1992 | Goodzeit |
| 5,100,084 | A | 3/1992 | Rahn et al. |
| 5,123,617 | A | 6/1992 | Linder et al. |
| 5,139,218 | A | 8/1992 | Bird et al. |
| 5,201,833 | A | 4/1993 | Goodzeit et al. |
| 5,205,518 | A | 4/1993 | Stetson, Jr. |
| 5,248,118 | A | 9/1993 | Cohen et al. |
| 5,277,385 | A | 1/1994 | Flament |
| 5,284,309 | A | 2/1994 | Salvatore et al. |
| 5,307,206 | A | 4/1994 | Haessig, Jr. |

(Continued)

FOREIGN PATENT DOCUMENTS

EP 0499815 8/1992

(Continued)

*Primary Examiner*—Dalena Tran
(74) *Attorney, Agent, or Firm*—McDermott Will & Emery LLP

(57) ABSTRACT

An attitude determination system is provided for determining attitude values of a yaw-steering spacecraft, and includes a rate sensor, at least one attitude sensor, and a processor operable to receive measured spacecraft body rates from the rate sensor, to receive measured spacecraft attitude values from the at least one attitude sensor, and to calculate estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

24 Claims, 7 Drawing Sheets

U.S. PATENT DOCUMENTS

| | | | |
|---|---|---|---|
| 5,308,024 A | 5/1994 | Stetson, Jr. | |
| 5,335,179 A | 8/1994 | Boka et al. | |
| 5,343,398 A | 8/1994 | Goodzeit et al. | |
| 5,349,532 A | 9/1994 | Tilley et al. | |
| 5,354,016 A | 10/1994 | Goodzeit et al. | |
| 5,400,252 A | 3/1995 | Kazimi et al. | |
| 5,412,574 A | 5/1995 | Bender et al. | |
| 5,424,872 A | 6/1995 | Lecuyer et al. | |
| 5,433,402 A | 7/1995 | Surauer et al. | |
| 5,452,869 A | 9/1995 | Basuthakur et al. | |
| 5,458,300 A | 10/1995 | Flament et al. | |
| 5,546,309 A | 8/1996 | Johnson et al. | |
| 5,556,058 A | 9/1996 | Bender | |
| 5,562,266 A | 10/1996 | Achkar et al. | |
| 5,597,142 A | 1/1997 | Leung et al. | |
| 5,608,634 A | 3/1997 | Goodzeit et al. | |
| 5,610,820 A | 3/1997 | Shankar et al. | |
| 5,646,847 A | 7/1997 | Ratan et al. | |
| 5,654,549 A | 8/1997 | Landecker et al. | |
| 5,687,933 A | 11/1997 | Goodzeit et al. | |
| 5,692,707 A | 12/1997 | Smay | |
| 5,738,309 A | 4/1998 | Fowell | |
| 5,745,869 A | 4/1998 | van Bezooijen | |
| 5,749,545 A | 5/1998 | Gnatjuk | |
| 5,765,780 A | 6/1998 | Barskey et al. | |
| 5,799,904 A | 9/1998 | Goodzeit et al. | |
| 5,806,804 A | 9/1998 | Goodzeit et al. | |
| 5,813,633 A | 9/1998 | Anzel | |
| 5,845,880 A | 12/1998 | Petrosov et al. | |
| 5,931,421 A | 8/1999 | Surauer et al. | |
| 5,984,236 A | 11/1999 | Keitel et al. | |
| 5,984,237 A | 11/1999 | Goodzeit | |
| 5,996,941 A | 12/1999 | Surauer et al. | |
| 6,020,956 A * | 2/2000 | Herman et al. | 356/139.01 |
| 6,026,337 A | 2/2000 | Krigbaum et al. | |
| 6,032,904 A | 3/2000 | Hosick et al. | |
| 6,039,290 A | 3/2000 | Wie et al. | |
| 6,047,927 A | 4/2000 | Heiberg et al. | |
| 6,089,507 A | 7/2000 | Parvez et al. | |
| 6,102,337 A | 8/2000 | Quartararo | |
| 6,108,594 A | 8/2000 | Didinsky et al. | |
| 6,116,543 A | 9/2000 | Koppel | |
| 6,145,790 A | 11/2000 | Didinsky et al. | |
| 6,213,432 B1 | 4/2001 | Koppel | |
| 6,260,805 B1 | 7/2001 | Yocum, Jr. et al. | |
| 6,282,467 B1 | 8/2001 | Shah et al. | |
| 6,285,927 B1 | 9/2001 | Li et al. | |
| 6,285,928 B1 | 9/2001 | Tilley et al. | |
| 6,292,722 B1 | 9/2001 | Holmes et al. | |
| 6,296,207 B1 | 10/2001 | Tilley et al. | |
| 6,314,344 B1 | 11/2001 | Sauer et al. | |
| 6,327,523 B2 | 12/2001 | Cellier | |
| 6,336,062 B1 | 1/2002 | Yamashita | |
| 6,356,815 B1 | 3/2002 | Wu et al. | |
| 6,381,520 B1 | 4/2002 | Highham et al. | |
| 6,389,336 B2 | 5/2002 | Cellier | |
| 6,441,776 B1 * | 8/2002 | Hein et al. | 342/357.06 |
| 6,442,385 B1 | 8/2002 | Marko | |
| 6,470,243 B1 | 10/2002 | Eyerly et al. | |
| 6,481,672 B1 | 11/2002 | Goodzeit et al. | |
| 6,629,672 B1 | 10/2003 | Goodzeit et al. | |
| 6,702,234 B1 | 3/2004 | Goodzeit | |
| 6,732,977 B1 | 5/2004 | Goodzeit et al. | |
| 2002/0119750 A1 | 8/2002 | Youssefi | |

FOREIGN PATENT DOCUMENTS

| | | |
|---|---|---|
| EP | 0568209 | 11/1993 |
| EP | 0604214 | 6/1994 |
| EP | 0780298 | 6/1997 |
| EP | 0922635 | 6/1999 |
| EP | 0937644 | 8/1999 |
| EP | 1024082 | 8/2000 |
| JP | 321597 | 1/1991 |

* cited by examiner

ATTITUDE DETERMINATION SYSTEM FOR YAW-STEERING SPACECRAFT

CROSS-REFERENCES AND RELATED APPLICATIONS

This application claims priority to U.S. Provisional Application No. 60/749,637, filed on Dec. 13, 2005, and entitled "ATTITUDE DETERMINATION SYSTEM FOR YAW-STEERING SPACECRAFT," which is incorporated by reference herein in its entirety for all purposes.

STATEMENT REGARDING FEDERALLY SPONSORED RESEARCH OR DEVELOPMENT

Not Applicable.

FIELD OF THE INVENTION

The present invention generally relates to spacecraft steering, and, in particular, relates to an improved attitude determination system for yaw-steering spacecraft.

BACKGROUND OF THE INVENTION

While some satellite missions, such as the current global positioning system (GPS), have significantly relaxed pointing requirements, other missions, such as future GPS (GPS III) and satellite radio, require much stricter pointing requirements. These next-generation satellite missions will use yaw-steering spacecraft that operate in highly inclined orbits and that implement a Sun Nadir Pointing (SNP) attitude profile, for which the yaw attitude varies continuously throughout the orbit by as much as 180°.

The advantage of an SNP attitude profile is that it allows good power and thermal conditions to be maintained while using a standard Geosynchronous Orbit (GEO) spacecraft configuration. One disadvantage with using SNP in a highly-inclined orbit is that, because the spacecraft experiences a large change in yaw attitude, the use of a standard attitude determination system (ADS) results in degraded pointing accuracy by an approximate factor of ten due to uncompensated gyro scale factor and misalignment uncertainties.

Typical attitude determination systems (ADS), such as those used on GEO spacecraft, do not directly consider gyro scale factor and misalignment errors. These systems often include a six-state Kalman filter, with three attitude states and with three gyro bias states that are assumed to be slowly varying constants. For a standard GEO mission, in contrast to a highly-inclined orbit configuration, this type of system is acceptable because the bias states capture the effects of scale factor and misalignment uncertainties, whose bias effects are nearly constant over an orbit. However, if the spacecraft implements a SNP yaw-steering profile as in a highly-inclined orbit configuration, the scale factor and misalignment uncertainties induce gyro biases that are proportional to the spacecraft angular rate and corrupt the attitude determination solution. In such a case, the standard six-state Kalman filter cannot be used without resulting in significantly degraded antenna-pointing performance.

One possible solution to this problem is to implement attitude sensors such as star trackers and perform periodic calibration slew maneuvers where the spacecraft is reoriented from one inertial attitude to another. In such a solution, the difference between the gyro-propagated attitude and the measured attitude can be used to estimate the gyro scale factor and misalignment errors. The estimates may then be used to compensate the gyro rates before they are processed using the standard six-state Kalman filter. The disadvantage of this approach is that the spacecraft cannot perform its mission while performing the necessary calibration maneuvers, which may be needed as frequently as once a month, thereby resulting in significant mission downtime.

Another solution is set forth in U.S. Pat. No. 6,298,288 ("the '288 patent"), issued on Oct. 2, 2001, in which a fifteen-state Kalman filter is used to estimate spacecraft attitude values, wherein the fifteen-state Kalman filter includes three states related to rate dependent gyro scale factor errors and six states related to rate dependent gyro misalignment errors. The fifteen-state Kalman filter disclosed in the '288 patent is applied to measured gyro rates $\omega_m$, in order to obtain corrected gyro rates $\omega_c$ which are then used to propagate attitude estimates. Although the fifteen-state Kalman filter disclosed in the '288 patent attempts to account for gyro scale factor errors and gyro misalignment errors, such errors are not sufficiently filtered from the resultant corrected gyro rates because the use of measured gyro rates $\omega_m$ in the Kalman filter propagates the gyro scale factor errors and the gyro misalignment errors through the Kalman filter to the "corrected" rates. Accordingly, the solution described in the '288 patent results in the output of noisy rates from the Kalman filter due to the effects of bias, noise, scale factor and alignment uncertainties that are inherent in measured gyro rates $\omega_m$, and will still be present to some degree even if "corrected" measured rates are used in the filter. Such noisy rates result in increased attitude estimation errors.

What is needed is an improved attitude determination system for yaw-steering spacecraft, such as those in a highly-inclined orbit configuration, that can automatically estimate and compensate for gyro scale factor and misalignment errors without interruption of the spacecraft mission, and without resulting in noisy rates and associated attitude estimate errors.

SUMMARY OF THE INVENTION

The present invention generally relates to an attitude determination system (ADS) for yaw-steering spacecraft, such as those in a highly-inclined orbit, which estimates and compensates for gyro scale factor and misalignment uncertainties without interruption of the spacecraft mission. The ADS system of the present invention provides pointing accuracy for a yaw-steering spacecraft comparable to that for a non-yawing spacecraft.

According to one embodiment of the invention, an attitude determination system is provided that includes a rate sensor, at least one attitude sensor, and a processor operable to receive measured spacecraft body rates from the rate sensor, to receive measured spacecraft attitude values from the at least one attitude sensor, and to calculate estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

In another embodiment, the invention is directed to a method for determining attitude values of a yaw-steering spacecraft, including the steps of receiving measured spacecraft body rates from a rate sensor, receiving measured spacecraft attitude values from the at least one attitude sensor, and calculating estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

In yet a further embodiment of the invention, a spacecraft is provided that includes a rate sensor, at least one attitude sensor, and a processor operable to receive measured spacecraft body rates from the rate sensor, to receive measured spacecraft attitude values from the at least one attitude sensor, and to calculate estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

Preferably, in the Kalman filter, the plurality of rate-dependent gyro error states correspond to a set of nine time-dependant error coefficients, each error coefficient representing a relationship between a spacecraft body rate component and a spacecraft attitude component. In addition, the calculation of the estimated spacecraft attitude values is preferably based on an attitude estimate error model that incorporates rate-dependent gyro errors through the use of a matrix of time-dependant error coefficients.

In this manner, the present invention provides an automatic estimation and compensation for gyro scale factor and misalignment errors without interruption of the spacecraft mission. In particular, the present invention allows a yaw-steering spacecraft, such as those in a highly-inclined orbit configuration, to use a fifteen-state Kalman filter based on commanded rates to obtain accurate estimated attitude values, thereby resulting in accurate pointing of the spacecraft.

In the following description of the preferred embodiments, reference is made to the accompanying attachment that forms a part thereof, and in which is shown by way of illustration a specific embodiment in which the invention may be practiced. It is to be understood that other embodiments may be utilized and changes may be made without departing from the scope of the present invention.

DETAILED DESCRIPTION OF THE INVENTION

The present invention addresses the limitations of prior-art systems with an improved attitude determination system applicable to spacecraft that implement a highly-inclined SNP orbit profile. The invention observes the effects of the gyro scale factor and misalignment uncertainties during an orbit of the SNP profile, and actively estimates the gyro scale factor and misalignment uncertainties by incorporating nine additional rate-based bias states into a Kalman filter formulation. By incorporating these auxiliary states into the Kalman filter, the effect of gyro scale factor and misalignment errors are automatically removed, without the need for calibration maneuvers and their associated mission down time.

As mentioned above, the present invention uses an improved Kalman filter that incorporates additional rate-based bias states to accurately estimate the attitude of a yaw-steering spacecraft in which the spacecraft rotates about the yaw axis during the orbit, thereby causing the spacecraft body rates to vary greatly.

Figure 1:
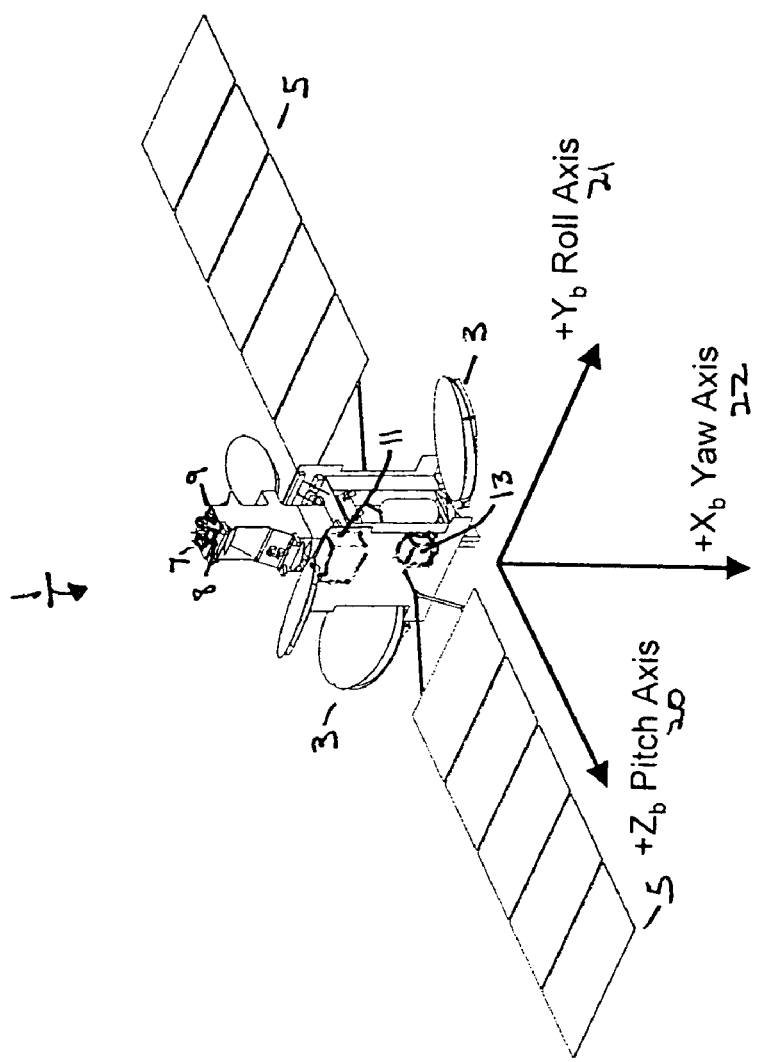
FIG. 1 is a diagram of an exemplary spacecraft in which the invention may be practiced according to one embodiment of the present invention.

FIG. 1 depicts exemplary spacecraft 1 in which the invention may be implemented. In particular, spacecraft 1 depicted in FIG. 1 is seen to include two payload antennas 3, and two solar panels 5 that respectively extend from opposite sides of spacecraft 1. The spacecraft also includes earth sensor 7, star tracker 8 and sun sensor 9 for measuring the attitude of spacecraft 1. Also provided are an inertial measurement unit (IMU) 11 for measuring body rates of spacecraft 1 and an on-board computer 13 that includes a processor and a memory that stores computer-executable process steps.

Also seen in FIG. 1 are the three axes of the body coordinate frame of spacecraft 1. In particular, the body coordinate frame of spacecraft 1 includes pitch axis 20 ($Z_b$), roll axis 21 ($Y_b$), and yaw axis 22 ($X_b$). In this regard, spacecraft body yaw axis 22 ($X_b$) is normal to the anti-Earth face of spacecraft 1 shown in FIG. 1. Pitch axis 20 ($Z_b$) is parallel to the solar array rotation axis, while roll axis 21 ($Y_b$) completes the right-hand coordinate frame.

Figure 2:
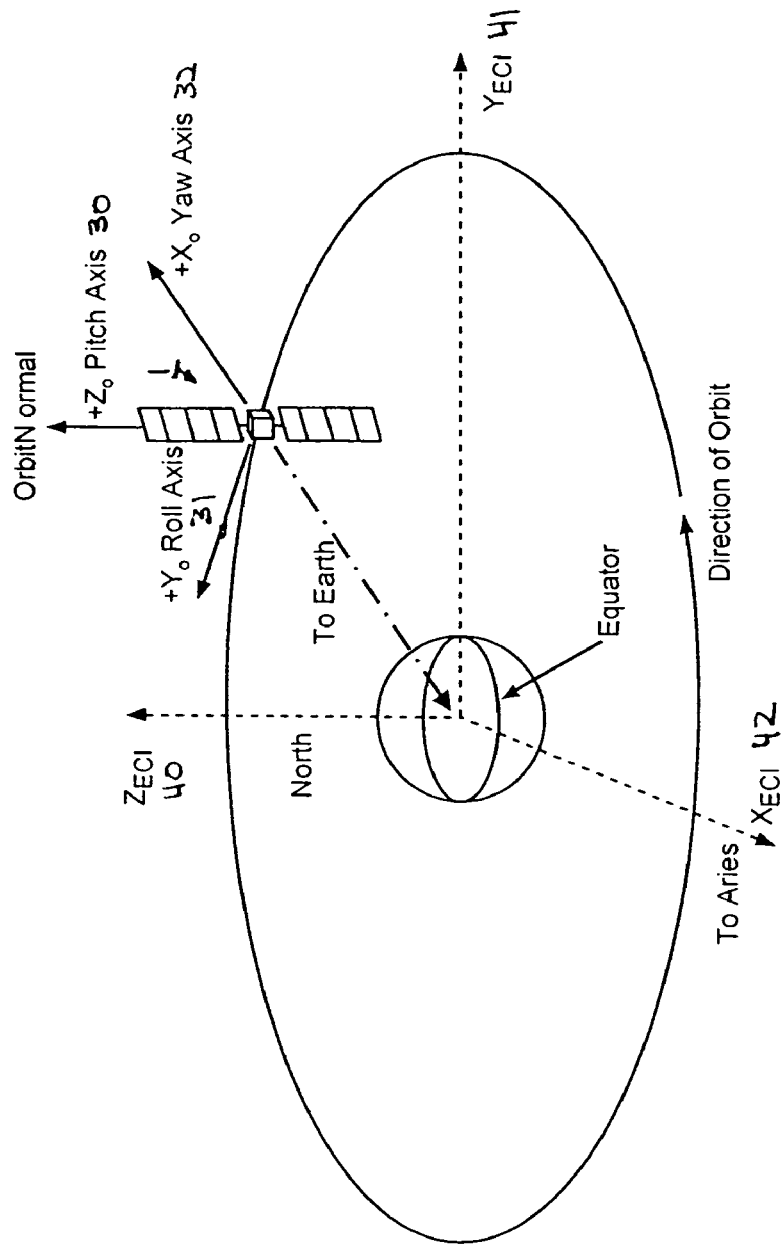
FIG. 2 is a diagram that illustrates a spacecraft in orbit and associated reference frames according to one embodiment of the present invention.

FIG. 2 illustrates spacecraft 1 in orbit with reference to the earth for purposes of explaining the reference frames used to define the spacecraft attitude. FIG. 2 shows the orbit coordinate frame, which is nominally aligned with the spacecraft body frame for zero yaw angle. The spacecraft body yaw axis 22 ($X_b$) and orbit frame yaw axis 32 ($X_o$) are aligned with the zenith vector. The spacecraft body pitch axis 20 ($Z_b$) and the orbit frame pitch axis 30 ($Z_o$) are aligned with the orbit normal vector, while the spacecraft body roll axis 21 ($Y_b$) and the orbit frame roll axis 31 ($Y_o$) complete the right-hand triad. FIG. 2 also shows the Earth-centered inertial (ECI) frame that is located at the center of the Earth, and is comprised of $Z_{ECI}$ coordinate axis 40, $Y_{ECI}$ coordinate axis 41, and $X_{ECI}$ coordinate axis 42. As spacecraft 1 orbits the Earth, the orbit and body frames rotate relative to the ECI frame. In addition, the body frame may rotate relative to the orbit frame for a spacecraft that implements a yaw-attitude profile such as SNP. For an SNP profile, and assuming small roll and pitch offsets, the spacecraft attitude relative to the orbit coordinate frame is represented by three rotation angles. The yaw angle rotation about the orbit frame yaw axis 32 ($X_o$) is denoted as $\psi$, the roll angle rotation about the body frame roll axis 21 ($Y_b$) is denoted as $\Phi$, and the pitch rotation about the body frame pitch axis 20 ($Z_b$) is denoted as $\theta$.

Figure 3:
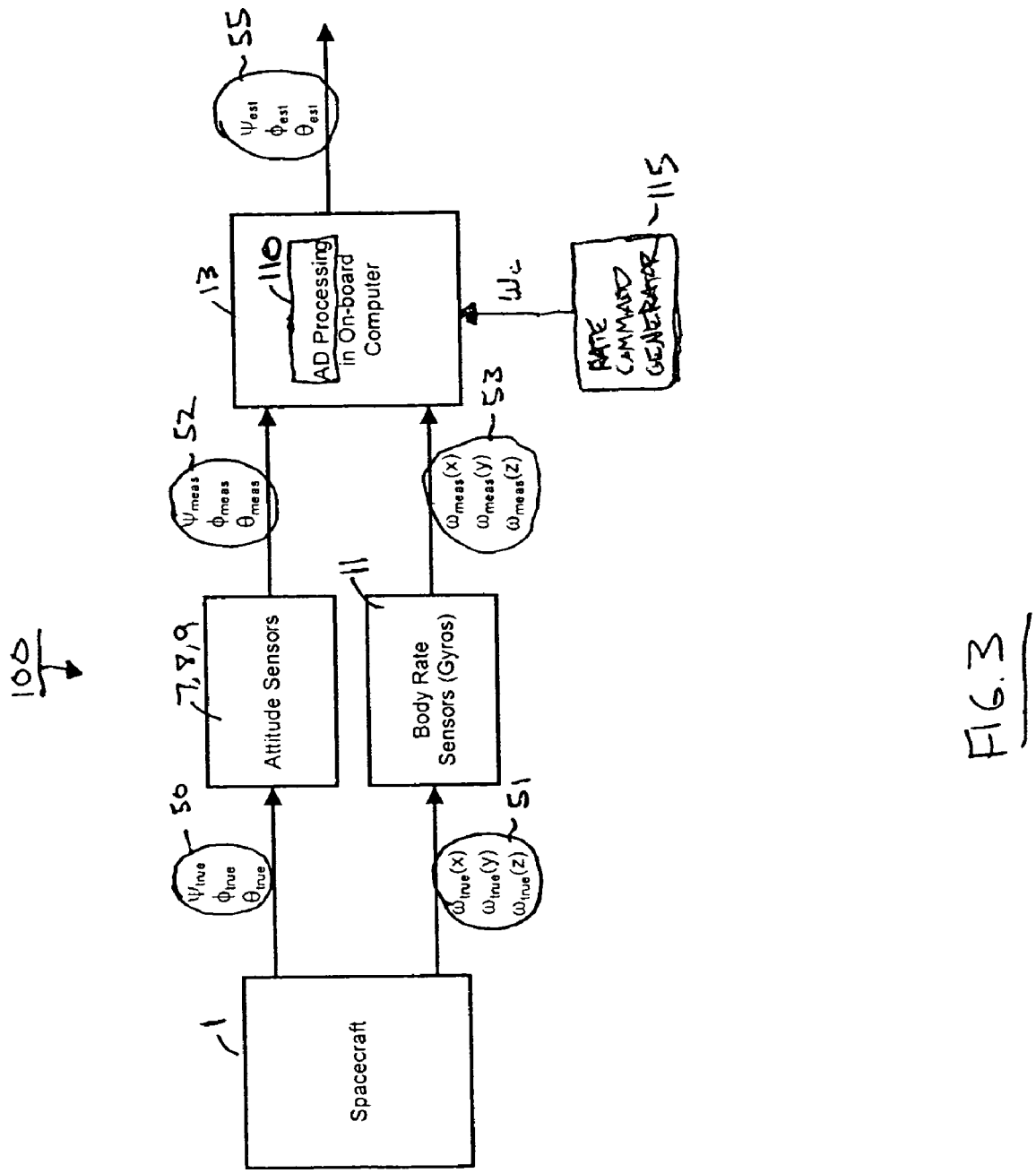
FIG. 3 is a block diagram of an attitude determination system according to one embodiment of the present invention.

FIG. 3 is a block diagram that illustrates an attitude determination system (ADS) 100, which is used to provide estimates 55 of the spacecraft yaw, roll and pitch attitude ($\psi_{est}$, $\Phi_{est}$, and $\theta_{est}$) based on attitude and body rate sensor measurements. The attitude sensors used preferably are an Earth Sensor Assembly 7 (ESA), which measures the spacecraft roll and pitch angles 52 ($\Phi_{meas}$ and $\theta_{meas}$), and a Sun Sensor Assembly (SSA) 9 which can be used to determine the spacecraft yaw angle 52 ($\psi_{meas}$) based on the measured sun angle in the body frame. Star Tracker Assembly 8 could also be used in another embodiment of the invention. FIG. 3 also shows the gyro rate sensors (IMU 11) used to measure the body rates 53 about the body yaw, roll, and pitch axes ($\omega_{meas}(x)$, $\omega_{meas}(y)$, and $\omega_{meas}(z)$). The gyros do not perfectly measure the true body rates 51 as discussed in more detail below. ADS 100 also includes attitude determination processing logic 110 that is implemented in the spacecraft on-board computer 13. Processing logic 110 estimates the spacecraft attitude based on the attitude and body rate sensor measurements. Lastly, rate command generator 115 provides commanded rates ($\omega_c(x)$, $\omega_c(y)$, and $\omega_c(z)$) to spacecraft 1 to achieve desired rates. As will be discussed further below, the commanded rates are used in the Kalman filter of the present invention to result in clean filtered corrected rates, thereby reducing attitude estimate errors.

The goal of ADS 100 is to minimize the error between the estimated and true spacecraft attitude. A Kalman filter (KF), formulated based on a model of the ADS dynamics and noise, is used to accomplish this. As mentioned above, the present invention improves upon known Kalman filters for spacecraft steering. Accordingly, a discussion of such a known KF is presented, followed by a discussion of the improved Kalman filter of the present invention.

The prior-art KF includes six states and can accurately estimate the attitude of non-yaw-steering spacecraft, such as a geostationary communications satellite, for which the attitude of the body frame is constant relative to the orbit frame. As shown below, the model used for the prior-art six-state Kalman filter is inadequate for yaw-steering spacecraft, such as GPS and satellite radio spacecraft that perform large yaw axis rotations each orbit to maintain good power and thermal conditions. This invention includes a KF augmented with additional states to improve the attitude determination accuracy for such yaw-steering spacecraft.

The implementation of the current state-of-the-art six-state KF is well known to those skilled in the art, and is based on the continuous-time, time-varying state-space model of the attitude determination error dynamics shown in Equation 1 where $\eta_s(t)$ and $\eta_m(t)$ are the sensor and measurement noise respectively.

$$\dot{x}(t) = A(t) \times (t) + \eta_s(t)$$

$$y(t) = C(t) \times (t) + \eta_m(t) \quad (1)$$

The state vector of the current state-of-the-art six-state KF is shown in Equation 2 below.

$$x(t) = \begin{bmatrix} e(t) \\ \omega_{bias}(t) \end{bmatrix} \quad (2)$$

The first three states e(t) are the attitude estimation errors defined as the three small angle rotations from the estimated spacecraft body frame to the true body frame. The ADS corrects the inertial attitude using e(t), computed at each time step based on the measurement residual (the difference between the actual sensor measurement and the expected measurement). The other three states $\omega_{bias}(t)$ are the gyro bias components in the body frame, which are modeled by a rate random walk process. As described below, this gyro error model is inadequate for maneuvering spacecraft that are the subject of this invention.

Equation 3 shows how the derivatives of the estimation error e(t) and the gyro biases $\omega_{bias}(t)$ are modeled. The derivative of the estimation error is dependent on the spacecraft angular body rates through a skew-symmetric matrix as shown in Equations 3 and 4.

$$\begin{bmatrix} \dot{e}(t) \\ \dot{\omega}_{bias}(t) \end{bmatrix} = \begin{bmatrix} W(t) & I_3 \\ 0 & 0 \end{bmatrix} \begin{bmatrix} e(t) \\ \omega_{bias}(t) \end{bmatrix} + \begin{bmatrix} \eta_1(t) \\ \eta_2(t) \end{bmatrix} \quad (3)$$

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix} \quad (4)$$

The model outputs in Equation 1 are the attitude sensor measurements, which are related to the body frame attitude determination errors through the sensitivity matrix C(t). For the exemplary systems discussed herein, the earth sensor assembly 7 (ESA) roll and pitch measurements are continuously used to update the KF state vector. The sun sensor assembly 9 (SSA) measurements are used to update yaw for several hours per day when sun sensor data is available. For purposes of this discussion of a known state-of-the-art six-state KF, SSA updates are omitted in order to highlight the ADS performance with ESA updates only. The derivation of the measurement sensitivity matrix, C(t), as well as the implementation of the discrete-time Kalman filter from the six-state model described above is well known to those skilled in the art.

Figure 4:
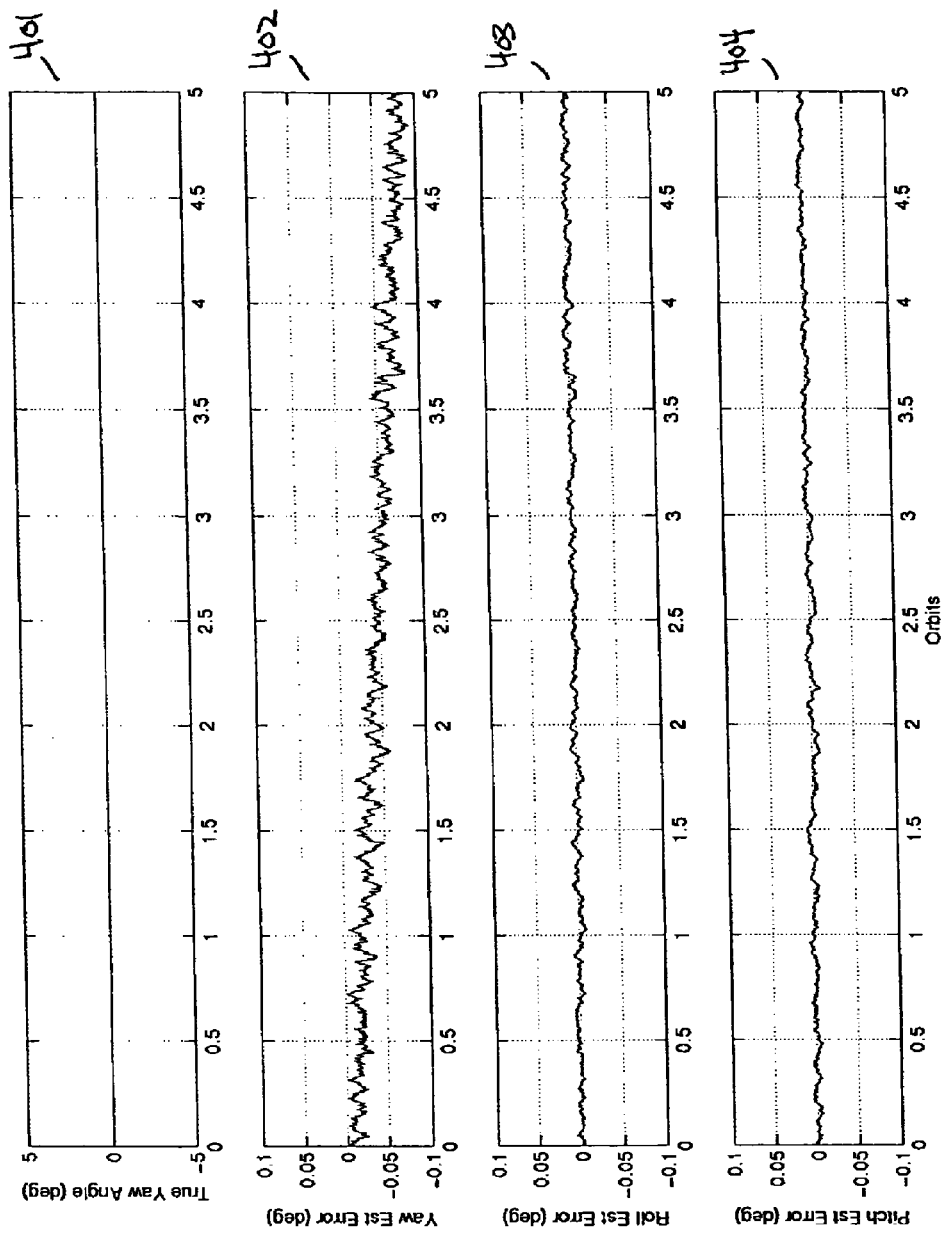
FIG. 4 is a set of data graphs that illustrate the performance of an attitude determination system implementing a known six-state Kalman filter for a non-yaw-steering spacecraft.

FIG. 4 is comprised of data graphs that illustrate the performance of an attitude determination system simulation implementing a known six-state Kalman filter for a non-yaw-steering spacecraft. In this regard, the first plot 401 shows that the true yaw angle between the orbit and body frames is zero for the entire simulation. The true roll and pitch angles (not shown) are zero for all the simulations presented in this disclosure. This simulation is representative of a typical geostationary communications satellite that tracks the orbit frame with zero yaw and roll body rates and a pitch rate equal to the geosynchronous orbit rate (1 revolution per sidereal day). The ADS simulations presented herein include noise models for the sensors. The gyro model includes scale factor and misalignment errors and a linear gyro bias drift rate. The simulated sensor ESA 7 and gyro errors (IMU 11) are listed in Table 1.

TABLE 1

| Modeled Sensor Errors | |
|---|---|
| ESA Noise | 0.02° (1 σ) |
| Gyro Noise Equivalent Angle | 1.15e−5° (1 σ) |
| Initial Gyro Bias | 1.0°/hr |
| Gyro Drift Rate | (0.01°/hr)/16 hr |
| Gyro Scale Factor Error | 0.005 |
| Gyro Misalignment | 0.2°/axis |

The simulation plots 402 to 404 in FIG. 4 show the steady-state ADS performance over 5 orbits. The roll and pitch attitude determination errors (403, 404) are small (less than 0.01 deg) since roll and pitch measurements are continuously available from the ESA. The gyro scale factor and misalignment errors have no effect on performance because the body rates are constant. The yaw attitude determination error 402 increases linearly due to the linear growth in the roll gyro bias uncertainty. In an actual implementation, the yaw estimation error would be corrected during portions of the orbit where sun sensor data is available.

Figure 5:
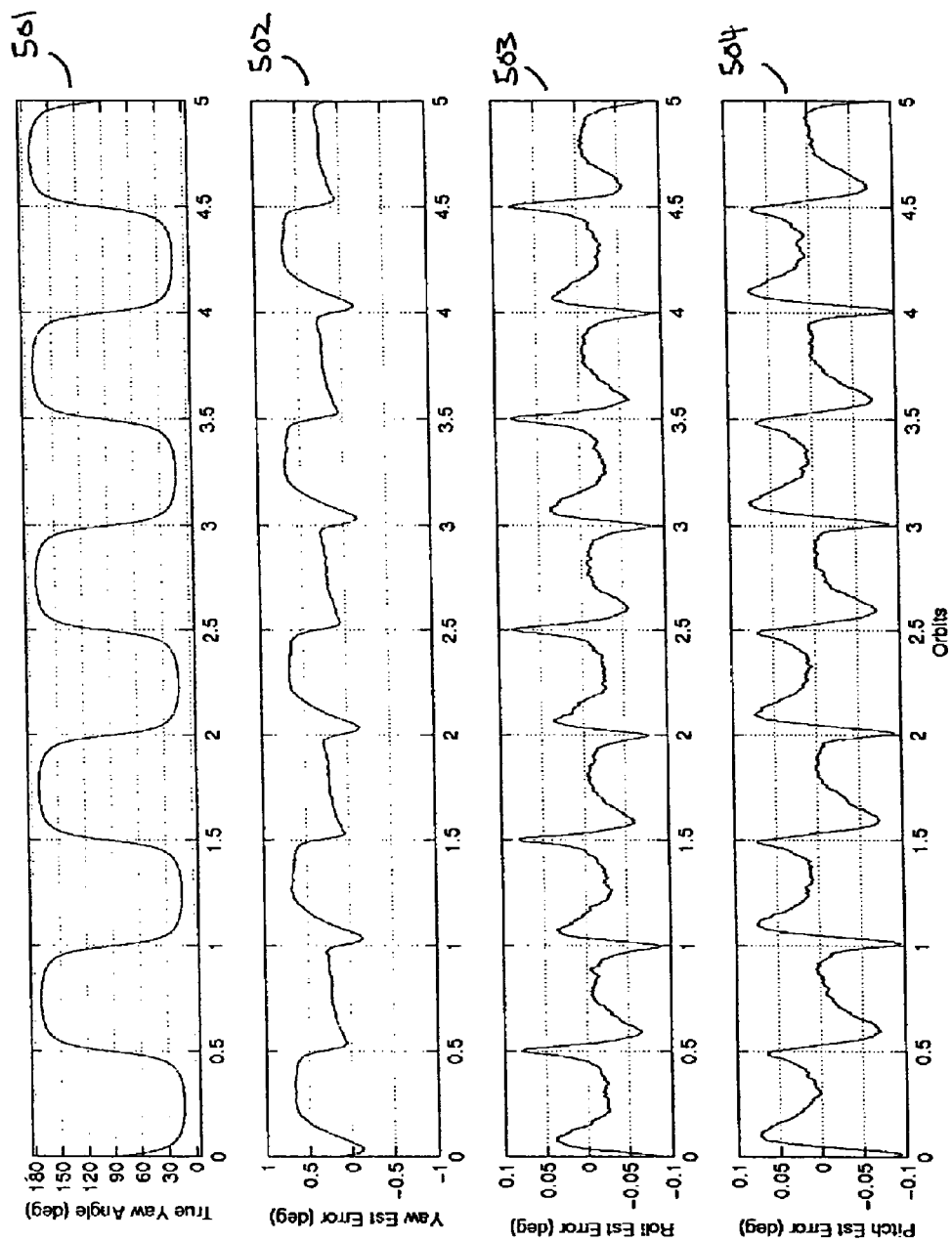
FIG. 5 is a set of data graphs that illustrate the performance of an attitude determination system implementing a known six-state Kalman filter for a yaw-steering spacecraft.

FIG. 5 is comprised of data graphs that illustrate the performance of an attitude determination system simulation implementing a known six-state Kalman filter for a yaw-steering spacecraft. In this regard, the spacecraft of the simulation depicted in FIG. 5 implements a Sun Nadir Pointing (SNP) attitude profile, where the spacecraft yaw varies over an orbit to keep the Sun in the spacecraft body yaw/roll plane. The first plot 501 in FIG. 5 shows an example SNP yaw profile corresponding to a sun angle 10° above the orbit plane, in which the spacecraft yaw angle varies between 10° and 170°. The gyro error model is the same as the previous case. As seen in the plots of FIG. 5, the results show that, compared to the non-yawing case, the attitude determination accuracy is degraded by roughly a factor of ten with roll and pitch errors of about 0.1 degree and a yaw error of 0.6 degrees. The degradation occurs because the known six-state error model ignores the gyro bias components resulting from the gyro scale factor and misalignment uncertainties, which have a dominant effect in a spacecraft using an SNP attitude profile because of the time varying body rates due to the yaw steering.

The present invention improves upon the six-state error model to remedy the foregoing problem. In this regard, Equation 5 shows a more accurate representation of the attitude estimation error dynamics. The model includes both constant gyro biases and rate dependent errors due to gyro scale factors and misalignments. The rate dependent errors couple into the estimation errors through the 3×3 K matrix shown in Equation 6.

$$\dot{e}(t) = w(t)e(t) + \omega_{bias} + K\omega_{true}(t) \tag{5}$$

$$K = \begin{bmatrix} k_{11} & k_{12} & k_{13} \\ k_{21} & k_{22} & k_{23} \\ k_{31} & k_{32} & k_{33} \end{bmatrix} \tag{6}$$

For non-maneuvering (non-yaw-steering) spacecraft, such as a geostationary communications satellite, the true spacecraft body rates are nearly constant. In this case, the third term in Equation 5 is constant (since K multiplies a constant rate input) and has the same effect on the attitude determination error dynamics as the gyro bias term included in the six-state KF. Gyro scale factor and misalignment uncertainties therefore do not adversely impact the accuracy of the prior-art six-state ADS for non-maneuvering spacecraft. However, as shown above, these rate dependent errors severely degrade attitude estimation performance for spacecraft that perform large yaw rotations.

The present invention augments the known six-state KF with additional rate dependent gyro errors modeled from Equation 5. The augmented, continuous-time state space model is shown in Equations 7 to 9. Nine states are added to the model with the vector, $k(t)$, shown in Equation 8.

$$\begin{bmatrix} \dot{e}(t) \\ \dot{\omega}_{bias}(t) \\ \dot{k}(t) \end{bmatrix} = \begin{bmatrix} w(t) & I_3 & \Omega(t) \\ 0_{3\times 3} & 0_{3\times 3} & 0_{3\times 9} \\ 0_{9\times 3} & 0_{9\times 3} & 0_{9\times 9} \end{bmatrix} \begin{bmatrix} e(t) \\ \omega_{bias}(t) \\ k(t) \end{bmatrix} + \begin{bmatrix} \eta_1(t) \\ \eta_2(t) \\ \eta_3(t) \end{bmatrix} \tag{7}$$

-continued $$k(t) = \begin{bmatrix} k_{11}(t) \\ k_{12}(t) \\ k_{13}(t) \\ k_{21}(t) \\ k_{22}(t) \\ k_{23}(t) \\ k_{31}(t) \\ k_{32}(t) \\ k_{33}(t) \end{bmatrix} \tag{8}$$

$$\Omega(t) = \begin{bmatrix} \omega_c & 0_{1\times 3} & 0_{1\times 3} \\ 0_{1\times 3} & \omega_c & 0_{1\times 3} \\ 0_{1\times 3} & 0_{1\times 3} & \omega_c \end{bmatrix} \tag{9}$$

The elements of this vector are estimates of the K matrix elements in Equation 6. The time behavior of these error coefficients are preferably modeled as a random walk process. As with the model in Equation 5, these errors couple into the attitude determination errors through the spacecraft body rates. Commanded spacecraft rates $\omega_c$ are used in Equation 9 to form $\Omega(t)$ instead of measured body rates, wherein $\omega_c = [\omega_{cx}(t), \omega_{cy}(t), \omega_{cz}(t)]$. In this manner, the Kalman filter of the present invention results in corrected rates with reduced noise compared to a Kalman filter which uses measured body rates. This effectively provides clean low-pass filtering for the estimated rate dependent errors, which vary slowly through the life of the spacecraft.

Figure 6:
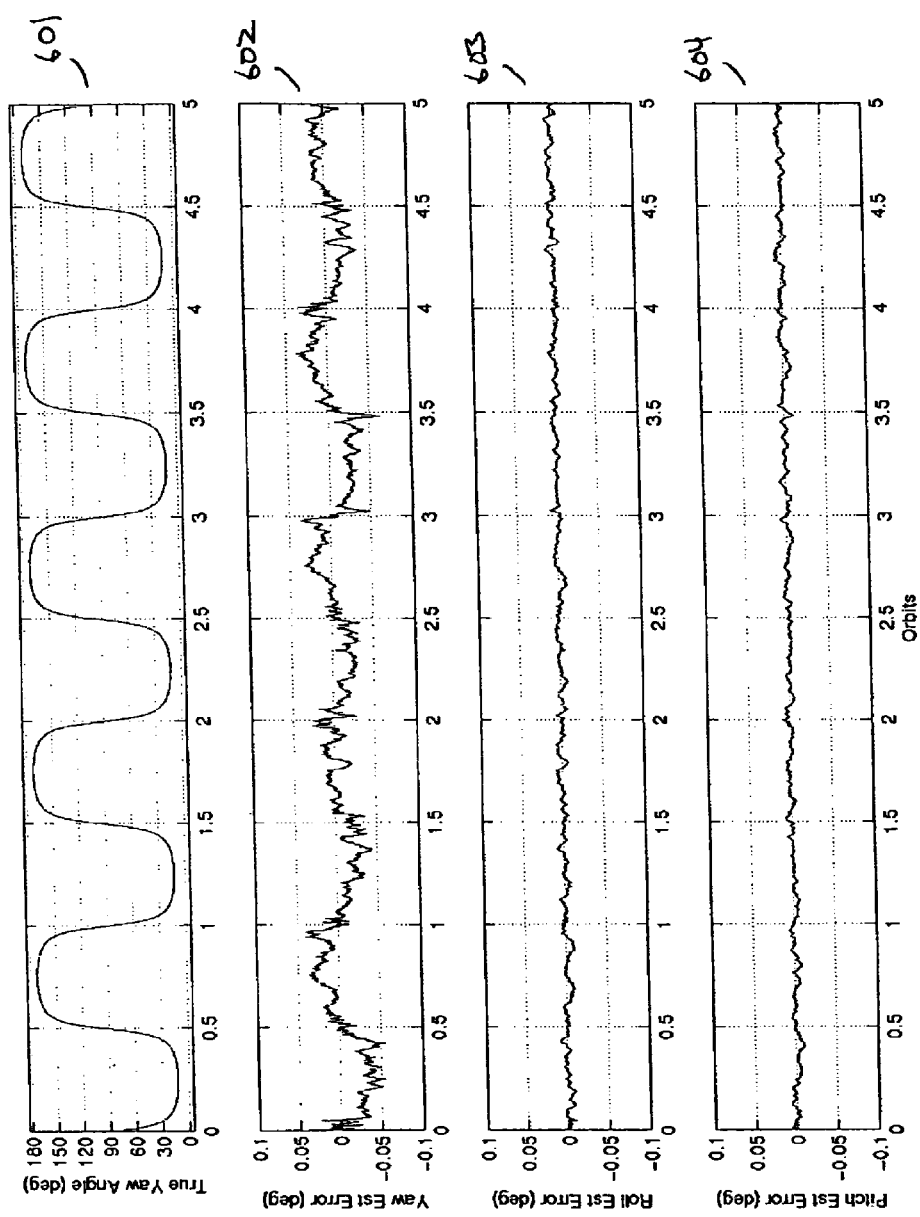
FIG. 6 is a set of data graphs that illustrate the simulated performance of the improved ADS implementing a fifteen-state Kalman filter for a yaw-steering spacecraft according to one embodiment of the present invention.

FIG. 6 is comprised of data graphs that illustrate the simulation performance of the improved ADS of the present invention which implements a fifteen-state Kalman filter for a yaw-steering spacecraft. The SNP profile and gyro errors are identical to the previous simulation shown in FIG. 5. Plots 602 to 604 of FIG. 6 verify significantly increased attitude estimation accuracy using the augmented 15-state KF with the attitude determination errors, gyro biases and rate dependent errors. The estimation errors using the augmented 15-state KF of the invention are reduced on all three attitude axes by almost a factor of ten as shown in Table 2, and are now comparable to the result for a non-yawing spacecraft shown in FIG. 4.

TABLE 2

KF Comparison - SNP Attitude Determination Errors

| Axis | Prior-Art 6-state KF | Improved 15-state KF |
|---|---|---|
| Yaw | 0.65° | 0.06° |
| Roll | 0.09° | 0.01° |
| Pitch | 0.10° | 0.01° |

Figure 7:
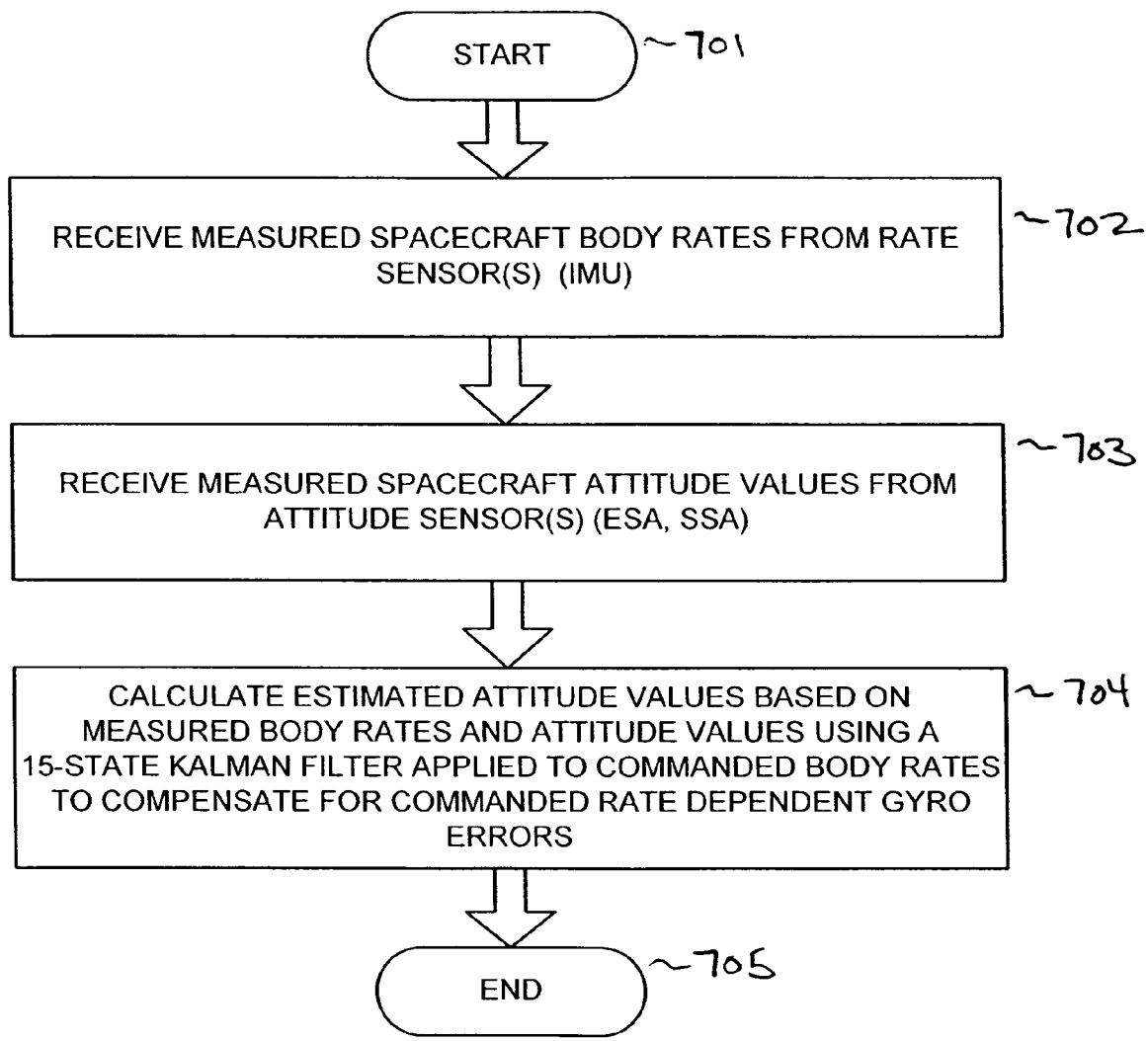
FIG. 7 is a flowchart for explaining the process of determining the attitude of a spacecraft according to one embodiment of the present invention.

FIG. 7 is a flowchart for explaining the process of determining the attitude of a spacecraft according to the 15-state KF of the present invention. Turning to FIG. 7, the process starts in step 701, and measured spacecraft body rates are received from a rate sensor, such as IMU 11, in step 702. In step 703, measured spacecraft attitude values are received from at least one attitude sensor, such as from ESA 7 and/or SSA 9, and in another embodiment from star tracker assembly 8. Then, in step 704, the estimated spacecraft attitude values are calculated based on the measured spacecraft body rates and the measured spacecraft attitude values by using a Kalman filter that includes a plurality of attitude estimate error states, a plurality of gyro bias states, and a plurality of commanded rate dependent gyro error states. The commanded rate dependent gyro error states are comprised of nine rate-dependent gyro error states that correspond to a set of nine time-dependant gyro error coefficients, each error coefficient representing a relationship between a spacecraft body rate component and a spacecraft attitude component. The KF uses commanded spacecraft body rate components which are output from a rate command generator in the control system on the spacecraft, thereby effectively providing low-pass filtering for the estimated rate dependent errors, which vary slowly through the life of the spacecraft. The process then ends in step 705.

In this manner, the present invention provides an accurate ADS for yaw-steering spacecraft by actively estimating the gyro scale factor and misalignment uncertainties by incorporating nine additional rate-based bias states into a Kalman filter formulation, based on commanded body rates. By incorporating these auxiliary states into the Kalman filter, the effect of gyro scale factor and misalignment errors are automatically removed, resulting in accurate attitude estimates, without the need for calibration maneuvers and their associated mission down time.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. An attitude determination system for determining attitude values of a yaw-steering spacecraft, the attitude determination system comprising:
   a rate sensor;
   at least one attitude sensor; and
   a processor operable to receive measured spacecraft body rates from the rate sensor, to receive measured spacecraft attitude values from the at least one attitude sensor, and to calculate estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

2. The attitude determination system of claim 1, wherein, in the Kalman filter, the plurality of attitude estimate error states comprises a pitch attitude estimate error state, a roll attitude estimate error state and a yaw attitude estimate error state, and the plurality of gyro bias states including a pitch rate gyro bias state, a roll rate gyro bias state and a yaw rate gyro bias state.

3. The attitude determination system of claim 2, wherein, in the Kalman filter, the plurality of commanded rate dependent gyro error states correspond to a set of nine time-dependant error coefficients, each error coefficient representing a relationship between a spacecraft body rate component and a spacecraft attitude component.

4. The attitude determination system of claim 3, wherein, in the Kalman filter, derivative functions of the attitude estimate error states, the gyro bias states, and the commanded rate dependent gyro error states are calculated according to:

$$\begin{bmatrix} \dot{e}(t) \\ \dot{\omega}_{bias}(t) \\ \dot{k}(t) \end{bmatrix} = \begin{bmatrix} W(t) & I_3 & \Omega(t) \\ 0_{3\times 3} & 0_{3\times 3} & 0_{3\times 9} \\ 0_{9\times 3} & 0_{9\times 3} & 0_{9\times 9} \end{bmatrix} \begin{bmatrix} e(t) \\ \omega_{bias}(t) \\ k(t) \end{bmatrix} + \begin{bmatrix} \eta_1(t) \\ \eta_2(t) \\ \eta_3(t) \end{bmatrix}$$

in which $\dot{e}(t)$ is the derivative function of the attitude estimate error states $e(t)$, $\dot{\omega}_{bias}(t)$ is a derivative function of the gyro bias states $\omega_{bias}(t)$, $\dot{k}(t)$ is a derivative function of the commanded rate dependent gyro error states $k(t)$ according to:

$$k(t) = \begin{bmatrix} k_{11}(t) \\ k_{12}(t) \\ k_{13}(t) \\ k_{21}(t) \\ k_{22}(t) \\ k_{23}(t) \\ k_{31}(t) \\ k_{32}(t) \\ k_{33}(t) \end{bmatrix}$$

in which $k(t)$ is comprised of the nine time-dependant error coefficients, and in which $W(t)$ is a matrix of spacecraft body rate components of $(\omega(t))$ according to:

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix}$$

and in which $I_3$ is a 3×3 identity matrix, $\Omega(t)$ is a matrix of commanded spacecraft body rate components according to:

$$\Omega(t) = \begin{bmatrix} \omega_c & 0_{1\times 3} & 0_{1\times 3} \\ 0_{1\times 3} & \omega_c & 0_{1\times 3} \\ 0_{1\times 3} & 0_{1\times 3} & \omega_c \end{bmatrix}$$

in which $\omega_c = [\omega_{cx}(t), \omega_{cy}(t), \omega_{cz}(t)]$, and in which $\eta_1(t)$, $\eta_2(t)$ and $\eta_3(t)$ are noise functions corresponding to the attitude estimate error states $e(t)$, the gyro bias states $\omega_{bias}(t)$, and the commanded rate dependent gyro error states $k(t)$.

5. The attitude determination system of claim 4, wherein the commanded spacecraft body rate components included in the matrix $\Omega(t)$ are output from a commanded rate generator on the spacecraft.

6. The attitude determination system of claim 1, wherein the calculation of the estimated spacecraft attitude values is based on an attitude estimate error model according to:

$$\dot{e}(t) = W(t)e(t) + \omega_{bias} + K\omega_{true}(t)$$

in which K is an error coefficient matrix according to:

$$K = \begin{bmatrix} k_{11} & k_{12} & k_{13} \\ k_{21} & k_{22} & k_{23} \\ k_{31} & k_{32} & k_{33} \end{bmatrix}$$

and in which ė(t) is the derivative function of attitude estimate error e(t), W is a matrix of spacecraft body rates (ω) according to:

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix}$$

and in which $\omega_{bias}$ is a set of gyro rate bias components, and $\omega_{true}(t)$ is a time-based set of actual spacecraft body rate components.

7. The attitude determination system of claim 1, wherein the rate sensor is an inertial measurement unit that outputs the measured spacecraft body rates.

8. The attitude determination system of claim 1, wherein the at least one attitude sensor is at least one of an earth sensor assembly, a star tracker assembly and a sun sensor assembly.

9. A method for determining attitude values of a yaw-steering spacecraft, the method comprising the steps of:
receiving measured spacecraft body rates a rate sensor;
receiving measured spacecraft attitude values from the at least one attitude sensor; and
calculating estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

10. The method according to claim 9, wherein, in the Kalman filter, the plurality of attitude estimate error states comprises a pitch attitude estimate error state, a roll attitude estimate error state and a yaw attitude estimate error state, and the plurality of gyro bias states including a pitch rate gyro bias state, a roll rate gyro bias state and a yaw rate gyro bias state.

11. The method according to claim 10, wherein, in the Kalman filter, the plurality of commanded rate dependent gyro error states correspond to a set of nine time-dependant error coefficients, each error coefficient representing a relationship between a spacecraft body rate component and a spacecraft attitude component.

12. The method according to claim 11, wherein, in the Kalman filter, derivative functions of the attitude estimate error states, the gyro bias states, and the commanded rate dependent gyro error states are calculated according to:

$$\begin{bmatrix} \dot{e}(t) \\ \dot{\omega}_{bias}(t) \\ \dot{k}(t) \end{bmatrix} = \begin{bmatrix} w(t) & I_3 & \Omega(t) \\ 0_{3\times 3} & 0_{3\times 3} & 0_{3\times 9} \\ 0_{9\times 3} & 0_{9\times 3} & 0_{9\times 9} \end{bmatrix} \begin{bmatrix} e(t) \\ \omega_{bias}(t) \\ k(t) \end{bmatrix} + \begin{bmatrix} \eta_1(t) \\ \eta_2(t) \\ \eta_3(t) \end{bmatrix}$$

in which ė(t) is the derivative function of the attitude estimate error states e(t), $\dot{\omega}_{bias}(t)$ is a derivative function of the gyro bias states $\omega_{bias}(t)$, $\dot{k}(t)$ is a derivative function of the commanded rate dependent gyro error states k(t) according to:

$$k(t) = \begin{bmatrix} k_{11}(t) \\ k_{12}(t) \\ k_{13}(t) \\ k_{21}(t) \\ k_{22}(t) \\ k_{23}(t) \\ k_{31}(t) \\ k_{32}(t) \\ k_{33}(t) \end{bmatrix}$$

in which k(t) is comprised of the nine time-dependant error coefficients, and in which W(t) is a matrix of spacecraft body rate components of (ω(t)) according to:

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix}$$

and
in which $I_3$ is a 3×3 identity matrix, $\Omega(t)$ is a matrix of commanded spacecraft body rate components according to:

$$\Omega(t) = \begin{bmatrix} \omega_c & 0_{1\times 3} & 0_{1\times 3} \\ 0_{1\times 3} & \omega_c & 0_{1\times 3} \\ 0_{1\times 3} & 0_{1\times 3} & \omega_c \end{bmatrix}$$

in which $\omega_c = [\omega_{cx}(t), \omega_{cy}(t), \omega_{cz}(t)]$, and in which $\eta_1(t)$, $\eta_2(t)$ and $\eta_3(t)$ are noise functions corresponding to the attitude estimate error states e(t), the gyro bias states $\omega_{bias}(t)$, and the commanded rate dependent gyro error states k(t).

13. The method according to claim 12, wherein the commanded spacecraft body rate components included in the matrix $\Omega(t)$ are output from a commanded rate generator on the spacecraft.

14. The method according to claim 9, wherein the calculation of the estimated spacecraft attitude values is based on an attitude estimate error model according to:

$$\dot{e}(t) = W(t)e(t) + \omega_{bias} + K\omega_{true}(t)$$

in which K is an error coefficient matrix according to:

$$K = \begin{bmatrix} k_{11} & k_{12} & k_{13} \\ k_{21} & k_{22} & k_{23} \\ k_{31} & k_{32} & k_{33} \end{bmatrix}$$

and in which ė(t) is the derivative function of attitude estimate error e(t), W is a matrix of spacecraft body rates (ω) according to:

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix}$$

and in which $\omega_{bias}$ is a set of gyro rate bias components, and $\omega_{true}(t)$ is a time-based set of actual spacecraft body rate components.

15. The method according to claim 9, wherein the rate sensor is an inertial measurement unit that outputs the measured spacecraft body rates.

16. The method according to claim 9, wherein the at least one attitude sensor is at least one of an earth sensor assembly, a star tracker assembly and a sun sensor assembly.

17. A spacecraft comprising:
a rate sensor;
at least one attitude sensor; and
a processor operable to receive measured spacecraft body rates from the rate sensor, to receive measured spacecraft attitude values from the at least one attitude sensor, and to calculate estimated spacecraft attitude values based on the measured spacecraft body rates and the measured spacecraft attitude values by using a Kalman filter that includes a plurality of attitude estimate error states, a plurality of gyro bias states, and a plurality of commanded rate dependent gyro error states.

18. The spacecraft of claim 17, wherein, in the Kalman filter, the plurality of attitude estimate error states comprises a pitch attitude estimate error state, a roll attitude estimate error state and a yaw attitude estimate error state, and the plurality of gyro bias states including a pitch rate gyro bias state, a roll rate gyro bias state and a yaw rate gyro bias state.

19. The spacecraft of claim 18, wherein, in the Kalman filter, the plurality of commanded rate dependent gyro error states correspond to a set of nine time-dependant error coefficients, each error coefficient representing a relationship between a spacecraft body rate component and a spacecraft attitude component.

20. The spacecraft of claim 19, wherein, in the Kalman filter, derivative functions of the attitude estimate error states, the gyro bias states, and the commanded rate dependent gyro error states are calculated according to:

$$\begin{bmatrix} \dot{e}(t) \\ \dot{\omega}_{bias}(t) \\ \dot{k}(t) \end{bmatrix} = \begin{bmatrix} w(t) & I_3 & \Omega(t) \\ 0_{3\times 3} & 0_{3\times 3} & 0_{3\times 9} \\ 0_{9\times 3} & 0_{9\times 3} & 0_{9\times 9} \end{bmatrix} \begin{bmatrix} e(t) \\ \omega_{bias}(t) \\ k(t) \end{bmatrix} + \begin{bmatrix} \eta_1(t) \\ \eta_2(t) \\ \eta_3(t) \end{bmatrix}$$

in which $\dot{e}(t)$ is the derivative function of the attitude estimate error states $e(t)$, $\dot{\omega}_{bias}(t)$ is a derivative function of the gyro bias states $\omega_{bias}(t)$, $\dot{k}(t)$ is a derivative function of the commanded rate dependent gyro error states $k(t)$ according to:

$$k(t) = \begin{bmatrix} k_{11}(t) \\ k_{12}(t) \\ k_{13}(t) \\ k_{21}(t) \\ k_{22}(t) \\ k_{23}(t) \\ k_{31}(t) \\ k_{32}(t) \\ k_{33}(t) \end{bmatrix}$$

in which $k(t)$ is comprised of the nine time-dependant error coefficients, and in which $W(t)$ is a matrix of spacecraft body rate components of $(\omega(t))$ according to:

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix}$$

and in which $I_3$ is a 3×3 identity matrix, $\Omega(t)$ is a matrix of commanded spacecraft body rate components according to:

$$\Omega(t) = \begin{bmatrix} \omega_c & 0_{1\times 3} & 0_{1\times 3} \\ 0_{1\times 3} & \omega_c & 0_{1\times 3} \\ 0_{1\times 3} & 0_{1\times 3} & \omega_c \end{bmatrix}$$

in which $\omega_c = [\omega_{cx}(t), \omega_{cy}(t), \omega_{cz}(t)]$, and in which $\eta_1(t)$, $\eta_2(t)$ and $\eta_3(t)$ are noise functions corresponding to the attitude estimate error states $e(t)$, the gyro bias states $\omega_{bias}(t)$, and the commanded rate dependent gyro error states $k(t)$.

21. The spacecraft of claim 20, wherein the commanded spacecraft body rate components included in the matrix $\Omega(t)$ are output from a commanded rate generator on the spacecraft.

22. The spacecraft of claim 17, wherein the calculation of the estimated spacecraft attitude values is based on an attitude estimate error model according to:

$$\dot{e}(t) = W(t)e(t) + \omega_{bias} + K\omega_{true}(t)$$

in which K is an error coefficient matrix according to:

$$K = \begin{bmatrix} k_{11} & k_{12} & k_{13} \\ k_{21} & k_{22} & k_{23} \\ k_{31} & k_{32} & k_{33} \end{bmatrix}$$

and in which $\dot{e}(t)$ is the derivative function of attitude estimate error $e(t)$, W is a matrix of spacecraft body rates ($\omega$) according to:

$$W(t) = -\begin{bmatrix} 0 & -\omega_z(t) & \omega_y(t) \\ \omega_z(t) & 0 & -\omega_x(t) \\ -\omega_y(t) & \omega_x(t) & 0 \end{bmatrix}$$

and in which $\omega_{bias}$ is a set of gyro rate bias components, and $\omega_{true}(t)$ is a time-based set of actual spacecraft body rate components.

23. The spacecraft of claim 17, wherein the rate sensor is an inertial measurement unit that outputs the measured spacecraft body rates.

24. The spacecraft of claim 17, wherein the at least one attitude sensor is at least one of an earth sensor assembly, a star tracker assembly and a sun sensor assembly.

* * * * *

UNITED STATES PATENT AND TRADEMARK OFFICE
CERTIFICATE OF CORRECTION

| | | |
|---|---|---|
| PATENT NO. | : 7,835,826 B1 | Page 1 of 1 |
| APPLICATION NO. | : 11/485974 | |
| DATED | : November 16, 2010 | |
| INVENTOR(S) | : Harald J. Weigl et al. | |

It is certified that error appears in the above-identified patent and that said Letters Patent is hereby corrected as shown below:

IN THE CLAIMS:

In Column 10, Line 46: Replace "$\omega_c = [\omega_{cx(t)}, \omega_{cy}(t), \omega_{cz}(t)]$", with -- $\omega_c = [\omega_{cx}(t), \omega_{cy}(t), \omega_{cz}(t)]$ --

Signed and Sealed this
Twenty-third Day of August, 2011

David J. Kappos
*Director of the United States Patent and Trademark Office*